(12) United States Patent  
Oppenheim (10) Patent No.: US 12,214,392 B2  
(45) Date of Patent: Feb. 4, 2025

(54) METHODS FOR LANDFILL VOLUME REDUCTION

(71) Applicant: DEBRIS DIVERSION SOLUTIONS, Friendswood, TX (US)

(72) Inventor: Judith P. Oppenheim, Friendswood, TX (US)

(73) Assignee: 3P PROJECTS LLC, Friendswood, TX (US)

( * ) Notice: Subject to any disclaimer, the term of this patent is extended or adjusted under 35 U.S.C. 154(b) by 1029 days.

(21) Appl. No.: 17/261,469

(22) PCT Filed: Jul. 23, 2019

(86) PCT No.: PCT/US2019/042956  
§ 371 (c)(1),  
(2) Date: Jan. 19, 2021

(87) PCT Pub. No.: WO2020/023465  
PCT Pub. Date: Jan. 30, 2020

(65) Prior Publication Data  
US 2021/0252569 A1   Aug. 19, 2021

Related U.S. Application Data

(60) Provisional application No. 62/702,034, filed on Jul. 23, 2018.

(51) Int. Cl.  
*B09B 3/40* (2022.01)  
*B09B 1/00* (2006.01)  
*B09B 5/00* (2006.01)

(52) U.S. Cl.  
CPC .............. *B09B 3/40* (2022.01); *B09B 1/00* (2013.01); *B09B 5/00* (2013.01)

(58) Field of Classification Search  
CPC . Y02W 30/58; B09B 5/00; B09B 1/00; B09B 3/35; B09B 3/32; B09B 3/30; B09B 3/40  
See application file for complete search history.

(56) References Cited

U.S. PATENT DOCUMENTS

2011/0278384 A1   11/2011   Ange, III  
2012/0042567 A1*   2/2012   Rawls ................ C10L 9/083  
                                                                 422/208

(Continued)

FOREIGN PATENT DOCUMENTS

DE           4222379    *  1/1994   ........... B01D 53/501  
DE           4222379 A1 *  1/1994   ........... B01D 53/501

(Continued)

OTHER PUBLICATIONS

Bates, et al., Modeling kinetics-transport interactions during biomass torrefaction: The effects of temperature, particle size, and moisture content, Fuel, vol. 137, 2014, pp. 216-229 (Year: 2014).*

(Continued)

*Primary Examiner* — Anthony J Zimmer  
*Assistant Examiner* — Eric Scott Sherman  
(74) *Attorney, Agent, or Firm* — Boulware & Valoir PLLC (57) ABSTRACT

Systems and methods for reducing the volume of construction and demolition (C&D) debris waste are described. The systems include a torrefaction unit that reduces the hardness of the waste while degrading it into volatiles and particles having a range of sizes. The variation in particle size allows for a more efficient compaction due to minimal void space and the imparted softness allows for increased compressibility. This results in the processed debris having a much smaller volume than had it not undergone the presently described methods, which reduces landfill tipping fees and extends the life of the landfill.

12 Claims, 4 Drawing Sheets

(56) References Cited

U.S. PATENT DOCUMENTS

| | | | |
|---|---|---|---|
| 2012/0085023 A1* | 4/2012 | Teal | C10L 5/44 |
| | | | 202/109 |
| 2014/0166465 A1* | 6/2014 | Varma | F27B 7/34 |
| | | | 201/37 |
| 2016/0304800 A1* | 10/2016 | Rautialinen | C10L 5/445 |
| 2017/0190975 A1 | 7/2017 | Hayward | |
| 2018/0072955 A1 | 3/2018 | Brandhorst, Jr. | |

FOREIGN PATENT DOCUMENTS

| | | |
|---|---|---|
| EP | 0671224 B1 | 7/1998 |
| EP | 3017886 A1 | 5/2016 |
| WO | 2015162338 A1 | 10/2015 |

OTHER PUBLICATIONS

Bach, et al., Process modeling and optimization for torrefaction of forest residues, Energy, vol. 138, 2017, pp. 348-354 (Year: 2017).*

Extended European Search Report for Application No. 19840584.7-1014/ 3826778 PCT/U.S. Pat. No. 2019042956 dated Mar. 14, 2022.

International Search Report and Written Opinion dated Nov. 1, 2019 of PCT/US19/42956 filed Jul. 23, 2019.

* cited by examiner

METHODS FOR LANDFILL VOLUME REDUCTION

PRIOR RELATED APPLICATIONS

This application claims priority of U.S. Application No. 62/702,034, filed Jul. 23, 2018, and to International Application No. PCT/US19/42956 Filed Jul. 23, 2019 each of which is incorporated by reference in its entirety for all purposes.

FEDERALLY SPONSORED RESEARCH STATEMENT

Not applicable.

REFERENCE TO MICROFICHE APPENDIX

Not applicable.

FIELD OF THE DISCLOSURE

The disclosure relates to processing solid waste destined for landfills, particularly processes for reducing construction and demolition waste volume.

BACKGROUND OF THE DISCLOSURE

Virtually all types of human activities generate waste or by-product materials Landfills are often the most cost-efficient ways to dispose of this waste, especially in countries with large open spaces. While resource recovery and incineration both require extensive investments in infrastructure, and material recovery also requires extensive manpower to maintain, landfills have fewer fixed—or ongoing—costs, allowing them to compete favorably.

Modem landfills are well-engineered facilities designed to receive specific kinds or classes of waste, including municipal solid waste (MSW), construction and demolition waste (C&D), and hazardous waste. In 2009, there were approximately 1,908 municipal solid waste landfills in the continental United States, all managed by the states where they are located. As modern landfills are expensive facilities that require a great deal of space and funding to build and maintain, much planning goes into designing a facility that will handle one or more classes of waste for a predetermined number of years.

However, unexpected increases m waste due to unplanned population expansion, natural disasters, or incoming waste from other states will reduce the planned lifetime of the landfills. An increase in public resistance to building new or to enlarge current facilities has also placed a premium on remaining capacity for storing waste. Thus, the cost of disposal has increased to allocate what is becoming a "scarce" resource.

Recently developed methods have focused on recycling more municipal solid waste and/or processing landfill-bound municipal solid waste to reduce the space demand in the landfill. However, little attention is being given to construction and demolition (C&D) waste. This is problematic because of the recent increase in C&D waste due to natural disasters and catastrophic storms. Flooding and excessive wind damage, especially in metropolitan areas, are becoming more frequent occurrences. For example, in 2017, the United States experienced, in a one-month period, three separate destructive hurricanes that impacted a large area of the United States and its territories. Hurricane Harvey (August 2017), Hurricane Irma (September 2017), and Hurricane Maria (September 2017). These hurricanes represent only a few of the natural disasters that occurred that year, which also included the northern California firestorm (October 2017), and tornadoes across the South (January 2017) and Midwest (Spring 2017, 2019).

Large quantities of debris, especially C&D waste, can complicate recovery efforts by hindering emergency personnel, damaging or blocking access to necessary infrastructure, and posing threats to human health and the environment. Further, the large increases in C&D waste overburdens existing landfills, thus reducing their ability to process the waste as well as reducing the capacity and ultimate lifetime of the landfill.

In contrast to municipal solid waste such as household trash and food scrapes, C&D waste encompasses inert, non-putrescible wastes that degrade very slowly or do not degrade at all. As such, recent improvements focus on mechanically breaking the material and/or pyrolyzing the solids for recycling and composting in an effort to divert the C&D waste from landfills. US20110278384, for instance, teaches the use of a mobile crusher for concrete at the source of C&D waste to obtain concrete solids between 1 and 5 inches in diameter. This crushed concrete can then be used as a gravel base in streets, foundational structures or new concrete products.

US20170190975 teaches the use of grinding of carbon-based debris followed by a high temperature treatment (over 500° C. at a flow rate of 1.8 Metric T/h) to cause pyrolytic reactions that upgrade the material and to obtain a high degree of volatilization. This results in a carbon-rich solid stream that may have varying porosity and surface areas and can be used as soil amendments, fuel, filler for rubber, in plastics, or as filtering aids and additives for road-surfacing materials. However, no provisions are made for capturing or scrubbing the sulfonated and/or chlorinated gases that are generated during the pyrolysis.

US20180072955 also uses grinding and pyrolysis to process carpet and rug debris. However, due to the chemicals in the backing, adhesives, and fire-retardants in the rug and carpet, the pyrolysis step results in a gas stream containing toxic halogenated organic compounds. As such, costly halogen and sulfur-trapping steps are required to strip the toxic chemicals from the gas stream before it can be reused or released.

Despite these improvements in recycling C&D waste, the above methods may not be applicable to recycling C&D waste from natural disasters because of logistical reasons (the need to expedite the clearance of roads and repair of homes after a severe storm), lack of market (due to recycled product performance penalties), contamination (both bacterial and environmental pollutants) and economics (relative cost of landfill disposal compared to recovery and purification steps)

As such, there still exists a need for processing methods for C&D materials that are landfill bound. Ideally, these methods can quickly and efficiently process C&D waste in any condition to aid in waste removal while reducing the volume of space occupied in the landfill.

SUMMARY OF THE DISCLOSURE

Described herein are systems and improved methods for processing construction and demolition (C&D) solid wastes that are destines for disposal in a landfill. Specifically, the volume of the solid waste is decreased through a multistep process that converts the waste into a vent stream with volatile compounds (including air regulated pollutants and ultrafines), and a "treated debris" stream that is conducive to being crushed and/or efficiently packed during optional downstream processing at a landfill. The vent stream is cleaned to capture the air regulated pollutants and/or ultrafines, allowing it to be released or recycled back to the process.

In a typical C&D waste landfill process, the debris is first sorted into recyclable materials, metals, and waste, with the waste being fed to a size reduction unit, such as a grinder, mill, shredder or crusher. From there, the size-reduced debris is sent to a dryer and compacted by a compaction unit before being transferred to the landfill. The volume of the compressed waste can be up to 20% less than untreated waste using this process.

The presently described systems modify this typical process by replacing the dryer and compaction unit with a torrefaction unit. The torrefaction unit is placed after a size reduction unit to achieve a large reduction in volume of about 20 to 90%, depending on the type of debris.

The torrefaction unit has a torrefaction vessel with rotary action and an oxygen lean sweep gas moving either co-current or countercurrent with the movement of the debris, a filtration system attached to the sweep gas exit vent on the torrefaction vessel, and a blower attached to the filtration system. The torrefaction vessel uses low-temperature heat to evaporate moisture, reduce the hardness of the debris and rotary action to induce collisions between the debris to further reduce its size. The sweep gas continuously carries moisture and volatiles away from the debris during the torrefaction process, which allows for an increase in the release of such components from the debris. The sweep gas also removes ultrafine particles from the torrefaction vessel to prevent or reduce the risk of an explosion from a buildup of the ultrafines as dust in the event oxygen leaks into the torrefaction vessel.

The sweep gas exits the torrefaction vessel through an exit vent to enter a filtration system. The filtration system uses at least one filter to separate the ultrafines and regulated air pollutants from the sweep gas to form a clean vent gas that can be released or reused as sweep gas. A blower is attached to the filtration system and is used to direct the vent gas away from the torrefaction system and/or to pressurize the as that will be reused as sweep gas. Additionally, the blower pulls a slight vacuum (about 2-10 psia or preferably about 4.6 psia) on the torrefaction unit to increase the amount of ultrafines that can be entrained in the sweep gas.

The torrefied debris exiting the torrefaction unit can be cooled before being transferred to a landfill. Alternatively, a portion of the torrefied debris can be returned to a size reduction unit and/or torrefaction unit for additional treatment. An optional compaction step can be performed on the torrefied debris, however it is not necessary to achieve the reduced volume. Thus, the described torrefaction unit can be added to readily available units) for e.g. soring and size reduction) at the debris collection hub (DCH) to improve C&D disposal operations.

In more detail, the torrefaction unit uses low-temperature heat (between 10° and 400° C.) and an oxygen lean environment to reduce the hardness of the solid while removing moisture and volatiles using vent-directed sweep gas with a low flow rate (exemplary rates are from about 5 m/s and about 70 m/s, preferably between 15 and 30 m/s or between 40 and 50 m/s). This allows for the separation of the material into volatiles, ultrafine particles, fine particles, mid-size particles, and coarse particles. The vent-directed sweep gas, also referred to as convection gas, is used to remove the moisture and volatiles, as well as ultrafines, from the torrefaction vessel. A blower provides a vacuum effect on the torrefaction unit, which allows for the use of a low sweep gas rate that will entrain the ultrafines, but not larger particles, in the sweep gas. Filters in a filtration system are utilized to clean the sweep gas exiting the torrefaction vessel by trapping regulated air pollutants and collecting the ultrafines fraction. The trapped regulated air pollutants or ultrafines from the sweep gas can be contained by the filters, and removed during routine maintenance. The spent filters, trapped regulated air pollutants and/or ultrafines can be sent to a landfill for disposal or a third party for use. The 'clean' sweep gas can be released as a vent gas, reused as a sweep gas, or divided into a vent gas and a reusable sweep gas stream using a valve positioned after the blower.

The coarse, mid-range and fine solid particles can be discharged from the torrefaction vessel, cooled, and transferred to a landfill where the particles can be further processed downstream if desired by compaction with a compaction unit, or compaction by simply driving heavy equipment over the dumped solids. Because the particle hardness has been reduced by the torrefaction process, the large particles are brittle and more conducive to being broken down, resulting in a range for particle sizes from fine to coarse. This allows for a more efficient packing during transport and the final placement as the void space between the larger particles are occupied by the newly formed smaller particles.

In some embodiments, the coarse torrefied particles can be cycled through the size reduction unit and/or torrefaction vessel two or more times to further reduce and dry particles. The large torrefied particles can be separated using a splitter or screen on the solids discharge line that allows the smaller particles to pass through for transfer to a landfill. Alternatively, the splitter can take a fraction of the torrefied solids, regardless of size, and return them to the size reduction unit. The amount of fines is expected to reach an equilibrium level since these small particles mostly leave the torrefaction vessel in the solids discharge line.

Similar to the fines, the amount of ultrafines is expected to reach an equilibrium level since these small particles mostly leave the torrefaction vessel entrained in the gas phase. If the amount of ultrafines in the torrefied solids becomes too large, indicated by excessive back pressure from the filtration system, then the splitter recycle ratio can be lowered, or the flow rate of the sweep gas can be reduced in combination with an increase in the pressure from the blower.

An advantage of returning a portion of the torrefied solids to the size reduction unit is that it helps to unload the size reduction unit by shifting the feed towards more brittle, friable torrefied particles and a lower concentration of hard, untreated solids that use more energy to grind. Because the properties of the debris have been augmented by the torrefaction step, namely the solids are more brittle, the torrefied solids in the splitter stream can be re-run along with fresh material in the size reduction unit without having to adjust the settings of the size reduction unit. Furthermore, the larger un-torrefied solids can serve as grinding media for medium particles or the torrefied recycle solids as the mixture is conveyed down the length of the torrefaction vessel. Additionally, multiple returns through the size reduction unit and/or the torrefaction vessel allows for the processing of larger particles up to 20 mm.

In some embodiments, cycling of torrefied solids back to the size reduction unit is needed because the original, untreated debris was too strong or too water-logged to be completely broken down and dried in the initial pass. By cycling the torrefied particles through the size reduction unit and torrefaction unit two or more times, new areas on the debris will be exposed, which increases moisture removal and allows for the heat to penetrate the material, which increases the solid's overall friability and dryness with each pass. Untorrefied 'large' particles can be used to further breakdown the torrefied particles, exposing additional wet surfaces.

When the torrefaction step is combined with the size reduction unit, a volume reduction of about 20 to 90% can be achieved, depending on the composition of the C&D waste being treated. This allows for a more efficient packing at the landfill. Thus, this process conserves space, and results in greater savings in landfill fees for disposal.

The present systems and methods include any of the following embodiments in any combination(s) of one or more thereof:

A method for reducing the volume of a construction and demolition (C&D) debris feedstock, wherein the C&D waste is first separated into a recycle stream, a landfill disposal stream, and a C&D debris feedstock. The recycle stream, also called a diversion stream, is taken to a recycling center for processing. The landfill disposal stream is sent to a landfill. The C&D debris feedstock is further processed by reducing the size of the C&D debris feedstock using a size reduction unit to produce a particle size distribution having a diameter between about 0.1 and about 10 mm, then heating it for at least 0.5 hours in a torrefaction vessel operating at a temperature of 100-400° C. The heat evaporates moisture and volatile compounds from the C&D debris feedstock, including air regulated pollutants. An oxygen lean sweep gas removes the moisture, volatile compounds, and generated ultrafines from the torrefaction vessel and passes through a filtration system having at least one filter. The flow rate of the oxygen lean sweep gas is below a velocity threshold to keep the solids in contact with the torrefaction vessel surface, and avoid entraining the fines fraction in the sweep gas and, subsequently, in the filter. The heated C&D debris feedstock is then transferred to a heat exchanger to produce a cooled torrefied C&D debris feedstock that can then be sent to a Debris Collection Hub or directly to a landfill. Optionally, the cooled torrefied C&D debris feedstock can be compressed by an optional compactor before being sent to a landfill or recycled again through size reduction and/or torrefaction units. The size reduction and torrefaction step reduces the volume of the feedstock by at least 20% compared to an untorrefied C&D debris feedstock.

A method for reducing the volume of a construction and demolition (C&D) debris feedstock, wherein the C&D waste is first separated into a recycle stream, a landfill disposal stream, and a C&D debris feedstock. The recycle stream, also called a diversion stream, is taken to a recycling center for processing. The landfill disposal stream is sent to a landfill. The C&D debris feedstock is further processed by reducing the size of the C&D debris feedstock using a size reduction unit to produce a particle size distribution having a diameter between about 0.1 and about 5 mm then heating for at least 0.5 hours it in a rotary kiln-based torrefaction vessel at a temperature of 100-4000° C. The heat evaporates moisture and volatile compounds, including air regulated pollutants, from the C&D debris feedstock. An oxygen lean sweep gas removes the moisture, volatile compounds, and a fraction of the ultrafines from the rotary kiln and passes through a filter in a filtration system attached to the vent of the rotary kiln. The flow rate of the oxygen lean sweep gas is below a velocity threshold to keep the solids in contact with the kiln surface and avoid entraining too many of the ultrafines fraction in a filter at the vent of the rotary kiln. The heated C&D debris feedstock is then transferred to a heat exchanger to produce a cooled torrefied C&D debris feedstock that can then be sent to a Debris Collection Hub or directly to a landfill. Optionally, the cooled torrefied C&D debris feedstock can be compressed by an optional compactor before being sent to a landfill or again recycled through size reduction unit or the torrefaction unit or both. The size reduction and torrefaction step reduces the volume of the feedstock by at least 40% compared to an untorrefied C&D debris feedstock.

A method for reducing the volume of a construction and demolition (C&D) debris feedstock comprising first separating C&D waste into a recycle stream, a landfill disposal stream, and a C&D debris feedstock. The size of the C&D debris feedstock is then reduced using a size reduction unit, wherein about 90% of the C&D debris feedstock has been reduced to a particle size distribution having a diameter between about 0.1 and about 5 mm. The particles that are up to 20 mm or less are transferred to a torrefaction vessel and heated for at least 0.5 hours at a temperature of 100-400° C., wherein the heating evaporates moisture and volatile compounds from the C&D debris feedstock. An oxygen-lean sweep gas is swept through the torrefaction vessel during the heating step, wherein the sweep gas removes moisture, ultrafine particles, and volatile compounds from the torrefaction vessel through a vent. The sweep gas exiting the torrefaction vessel is passed through at least one adsorbent bed that acts as a filter to remove regulated air pollutants and ultrafine particles. The ultrafine particles can be removed from the filter (e.g. during routine maintenance) and combined with other solids being loaded for landfill disposal. The adsorbent can be replaced as needed due to saturation by the pollutants, and the spent adsorbent can be regenerated off-site. The moisture and volatile compounds are then separated from the sweep gas to form a clean, reusable sweep gas that can be fed back to the torrefaction vessel in a co-current or countercurrent direction relative to the C&D debris feedstock. The torrefied C&D debris feedstock is then transferred to a heat exchanger, wherein the heat from the debris is used to warm the reusable sweep gas before it is returned to the rotary kiln. The cooled torrefied C&D debris feedstock is then split into two streams by a splitter. The first stream (about 75 to <100% by volume of the torrefied C&D debris feedstock) is transferred to the landfill. The second stream (about >0 to 25%) is returned to the size reduction unit to repeat one or more (or all) of the size reduction, torrefaction and heat exchange at least one more time. The volume of the torrefied feedstock is reduced by at least 40% compared to an unheated C&D debris feedstock.

Any of the above methods further comprising the steps of filtering one or more low-boiling regulated air pollutants from the sweep gas exiting the torrefaction unit. The filtering step uses at least one of an adsorbent bed, a membrane, a candle filter, and/or a bag house. The moisture and volatile compounds can then be separated from the sweep gas to form a clean sweep gas. The clean sweep gas can be reused in the torrefaction unit, and the separated moisture and volatile compounds can be contained and sent to a landfill or other third party for disposal or reuse.

Any of the above methods, wherein the volume of the torrefied feedstock is reduced by at least 40% compared to similar method without a torrefaction step.

Any of the above methods further comprising the step of transferring heat from the heated C&D debris feedstock to the clean sweep gas using said heat exchanger.

Any of the above methods, wherein the torrefaction vessel is a rotary kiln or rotary dryer capable of providing heat to about 100 to about 400° C.

Any of the above methods, wherein the size reduction unit is a grinder, a shredder, a crusher or a mill.

Any of the above methods, further comprising the step of splitting the torrefied C&D debris feedstock into two streams before the transferring step, wherein the first stream is returned to the size reduction unit to undergo size reduction, torrefaction, and cooling one or more times, and the second stream is transferred to the landfill. The splitting can be sized based, with the larger particles recycled for further treatment, whilst the smaller are transferred to the landfill. Alternatively, the splitting can be volume based, with greater than 0% to about 60% of the torrefied C&D debris feedstock being recycled for further treatment, whilst the remaining torrefied C&D debris feedstock is transferred to the landfill.

Any of the above methods, wherein the oxygen lean sweep gas is selected from a group comprising a low pressure superheated steam and oxygen lean air, a low purity carbon dioxide (about 99%), a low purity nitrogen (about 99% nitrogen), or exhaust, aka clean sweep gas, from the torrefaction unit.

Any of the above methods, wherein the oxygen lean sweep gas is comprised of low pressure superheated steam.

Any of the above methods, wherein the low pressure superheated steam is heated to about 30 degrees above its dewpoint before entering the torrefaction unit.

Any of the above methods, wherein the velocity threshold of the sweep gas is between 5 and 70 m/s or between 30 and 46 m/s or between 15 and 25 m/s.

Any of the above methods, wherein the torrefaction temperature is between about 200 and about 300° C.

Any of the above methods, wherein the torrefaction temperature is between about 150 and about 300° C.

A system for reducing the volume of a construction and demolition debris feedstock comprising a sorting unit for separating recyclable materials from non-recyclable construction and demolition debris to produce a construction and demolition debris feedstock; a size reduction unit for reducing the size of the construction and demolition debris feedstock to particles with diameters between about 0.1 and 10 mm Once the debris is reduce to particles, the particles can be torrefied by a torrefaction unit. The torrefaction unit comprises a torrefaction vessel for torrefying the particles for at least 0.5 hours at 100 to 400° C., a filtration system, and a blower. The torrefaction vessel has an entrance and outlet for the particles, an entrance and exit for a sweep gas, and a spiral decline from the entrance and outlet of the particles such that the particles collide into each other and the inside walls of the torrefaction vessel as they move through the torrefaction vessel. The sweep gas flows through the torrefaction vessel to remove moisture, volatiles, air regulated pollutants and/or ultrafine particles evolved during torrefaction. After exiting the torrefaction vessel, the sweep as flows into a filtration system attached to the sweep gas exit, wherein the filtration system has a filter for adsorbing the air regulated pollutants and ultrafine particles in the sweep gas to form a clean sweep gas. The blower is attached to the filtration system and creates a vacuum on the torrefaction unit and pushes the clean sweep gas away from the torrefaction unit. After the torrefaction unit is a heat exchanger for receiving the heated particles exiting the torrefaction vessel, wherein the heat exchanger using the heat from the heated particles to heat the sweep gas and/or clean sweep gas before it enters the torrefaction vessel. Once the torrefied particles are cooled, they can be split by a splitter, wherein a first fraction of the cooled torrefied particles is returned to said size reduction unit and said torrefaction unit and a second fraction of the cooled torrefied particles is transferred to a landfill.

A improved system for reducing the volume of a C&D debris feedstock, the system including a sorting unit for separating recyclable materials from non-recyclable C&D debris feedstock, a size reduction unit for reducing the size of the C&D debris feedstock to between about 0.1 and 10 mm, a dryer for drying the C&D debris feedstock and a compactor for compressing said C&D debris feedstock, the improvement comprises replacing the dryer and compactor with a torrefaction unit, wherein the torrefaction unit evaporates and removes moisture, and removes regulated air pollutants and volatile components from the C&D debris feedstock and increases the brittleness of the remaining feedstock such that the volume of the torrefied C&D debris feedstock is about 20% less than untorrefied C&D debris.

Any of the above systems, wherein the torrefaction unit comprises a torrefaction vessel having a sweep gas flowing therethrough, a filtration system attached to the vent exit of the torrefaction unit, and a blower attached to the filtration unit, wherein the blower adjusts the pressure of the torrefaction unit.

Any of the above systems, wherein the torrefaction vessel is a rotary kiln with direct or indirect firing.

Any of the above systems, wherein the rotary kiln has co-current or countercurrent sweep gas.

Any of the above systems, wherein the torrefaction unit has a sweep gas for sweeping moisture, volatiles, regulated air pollutants, and ultrafine particles out of a vent in the torrefaction vessel.

Any of the above systems, further comprising a filtration unit and adsorbent bed for adsorbing regulated air pollutants and fine particles from the sweep gas to form a clean sweep gas.

Any of the above systems, further comprising a heat exchanger after the torrefaction unit, wherein the heat from the torrefied C&D debris feedstock is transferred to the clean sweep gas before the clean sweep gas re-enters the torrefaction unit.

Any of the above systems, further comprising a blower after the filter system for creating a vacuum on the torrefaction unit and increasing the pressure of the clean sweep gas before it is introduced into the torrefaction unit.

Any of the above systems, further comprising a splitter after the torrefaction unit that splits the torrefied C&D debris feedstock into two streams, wherein one stream is transferred to a landfill and the second stream is returned to the size reduction unit for another pass through the size reduction and torrefaction units.

Any of the above systems, further comprising a splitter after the heat exchanger that splits the torrefied C&D debris feedstock into two streams, wherein one stream is transferred to a landfill and the second stream is returned to the size reduction unit for another pass through the size reduction unit, the torrefaction unit, and the heat exchanger.

Any of the above methods or systems, wherein said splitter splits the cooled torrefied particles by size, wherein the larger particles are returned to the size reduction unit and torrefaction unit, or splits by volume, wherein between greater than 0 to about 60% of said cooled torrefied particles are returned to the size reduction unit and torrefaction unit.

Any of the above methods or systems, wherein the torrefaction vessel has an entrance and outlet for the feed, and a spiral decline from the entrance and outlet of the particles such that the feed collide into each other and the inside walls of the torrefaction vessel as the feed moves through the torrefaction vessel.

Any of the above system, wherein the torrefaction vessel operates between about 200 and about 300° C.

Any of the above system, wherein the torrefaction vessel operates between about 150 and about 300° C.

Definitions

As used herein, "construction and demolition (C&D) waste" means any solid waste resulting from the construction, remodeling, repair and demolition of utilities, structures and roads; and uncontaminated solid waste resulting from land clearing. Such waste includes, but is not limited to bricks, concrete and other masonry materials, soil, rock, painted, treated and/or coated wood and wood products, land clearing debris, brush, wall coverings, plaster, drywall, plumbing fixtures, non-asbestos insulation, roofing shingles and other roof coverings, asphaltic pavement, glass, plastics with a melting point above 300° C. and are not sealed in a manner that conceals other wastes, empty buckets ten gallons or less in size and having no more than one inch of residue remaining on the bottom, electrical wiring and components containing no hazardous liquids, and pipe and metals that are incidental to any of the above.

Solid waste that is not C&D waste (even if resulting from the construction, remodeling, repair and demolition of utilities, structures and roads and land clearing) includes, but is not limited to, asbestos waste, garbage, corrugated container board, plastics with a melting point below 300° C. electrical fixtures containing hazardous liquids such as fluorescent light ballasts or transformers, fluorescent lights, carpeting, furniture, appliances, tires, drums, containers greater than ten gallons in size, any containers having more than one inch of residue remaining on the bottom and fuel tanks.

As used herein, the term "municipal solid waste" refers to waste that typically consists of everyday items that are used and then thrown away, such as product packaging, grass clippings, furniture, clothing, bottles, food scraps, newspapers, appliances, paint, and batteries.

As used herein, the terms "transfer statio" or "debris collection hub" refer to facilities where solid waste is unloaded from collection vehicles, sorted and/or processed, and then reloaded onto larger long-distance transport vehicles (e.g. trains, trucks, barges) for shipment to landfills or other treatment or disposal facilities.

As used herein, the terms "torrefaction" or "torrefied" refer to the process of heating masses at mild pyrolysis temperatures (between 10° and 400° C.) in an oxygen-lean atmosphere to produce a dry product with no biological activity like rotting. The term "oxygen lean" means a concentration of about 10% or less of oxygen ($O_2$).

As used herein, the term "particle" refers to a relatively small, discrete portion or amount of a solid phase. It does not refer to any particular shape or compositions. The particles can be distinguished based on their size with "coarse" or "large" particles referring to particles having an individual particle diameter greater than 5 mm. "Mid-size" or "mid-range" particles have an individual particle diameter between greater than 1 mm and 5 mm. "Fine particles" or "fines" refer to particles having an individual particle diameter between greater than 100 microns to 1 mm. "Ultrafine particles" or "ultrafines" refer to particles having an individual particle diameter between greater than 0 and less than 100 microns.

As used herein, the term "diversion" or "diverted" refer to the process of diverting waste for recycling or reuse.

As used herein, the term "D50" refers to the diameter of the particle in a population of particles that is larger than 50% of a sample's mass and smaller than the remaining 50% of a sample's mass.

As used herein, the term "bulk density" refers to the ratio of the mass to the volume (including the inter-particle void volume) of the particles in the feed streams. The "tapped density" is obtained by mechanically tapping a container of the material, as would occur when discharging torrefied solids to a container for transfer to a landfill.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

The following abbreviations are used herein:

| ABBREVIATION | TERM |
| --- | --- |
| C&D waste | construction and demolition waste |
| OCH | Debris Collection Hub |
| MSW | municipal solid waste |
| OSB | Oriented Strand Board |
| PSD | Particle size distribution |
| RDF | refuse derived fuel |

DESCRIPTION OF EMBODIMENTS OF THE DISCLOSURE

The disclosure describes novel systems and methods for processing C&D waste destined for landfills. Specifically, the waste undergoes at least one size reduction step and at least one torrefaction step that reduces the hardness of the debris while releasing volatiles. The more brittle particles are now readily compacted into a much smaller volume than had they not undergone the torrefaction process, which thereby conserves landfill space.

The presently disclosed systems and methods are exemplified below with respect to a transfer site treatment center or debris collection hub for C&D wastes. However, this is exemplary only, and the invention can be broadly applied to treatment processes at landfills and the treatment of other debris. The following examples and figures are intended to be illustrative only, and not unduly limit the scope of the appended claims.

Figure 1:
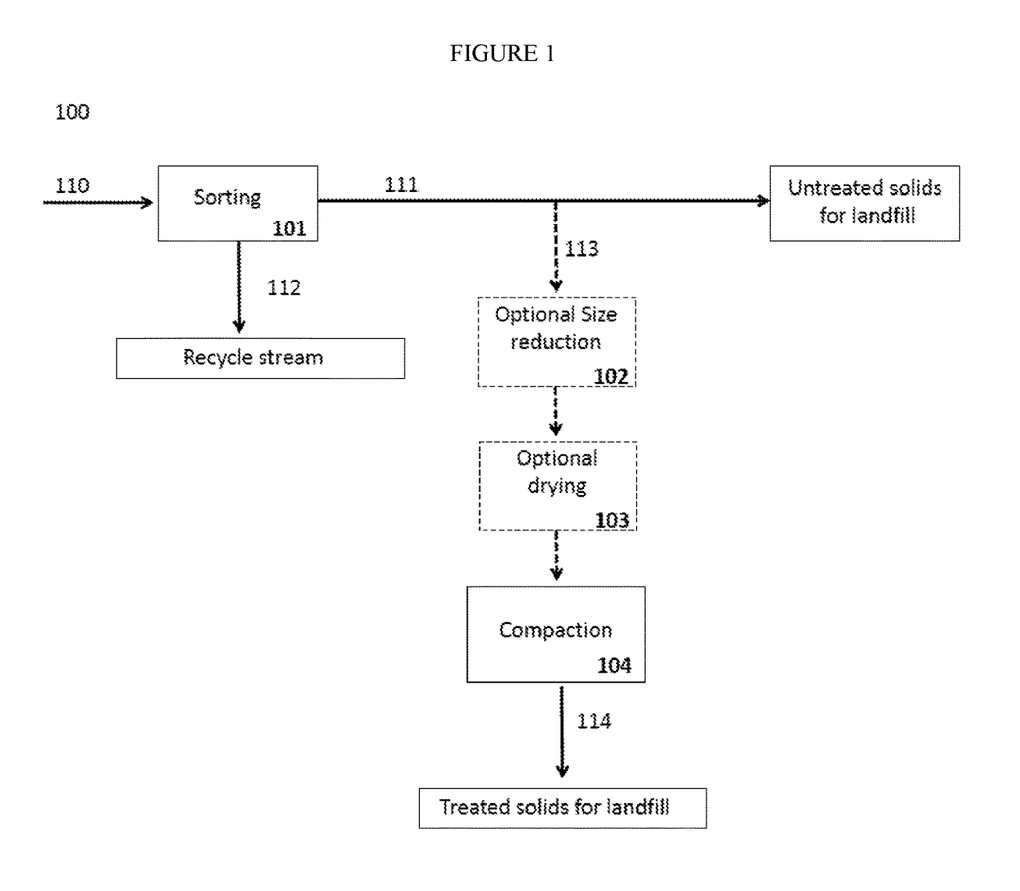
FIG. 1. Schematic of a typical waste processing system at a debris collection hub.

FIG. 1 displays the basic pretreatment process 100 for C&D wastes at a transfer site. Transfer sites are often an intermediate stop for debris between the construction (or demolition) site and the landfill. At the transfer site, the debris 110 is first sorted by a sorting unit 101 to separate out the recyclable materials that are to be picked up by recycle agents (individuals, businesses, and/or non-profits). This recycle stream 112 can include material that could be composted (e.g. brush) or recycled (e.g. unused drywall). The sorting unit may also have metal detectors that will activate a reject trap if metal components are present. The metal can also be reused or recycled.

The remaining debris 111 may then be loaded onto a truck or other large vehicle for transfer to a landfill or undergo additional treatment (shown with dashed arrows) to reduce their volume 113 before being sent to the landfill 114. By reducing the volume, more material can be loaded onto the transfer truck bed and thus lowering disposal charges. The additional treatment can be as simple as compressing the material in a compactor 104. Optionally size reduction processes, such as grinding or milling, 102 and drying processes 103 may be used before compaction 104 to further aid in volume reduction. In yet another variation, the remaining debris 111 may be separated by e.g. size, with the small items being loaded directly onto a truck destined for a landfill and the larger items undergoing optional volume reduction treatments.

Trucks or other large vehicles (trains, barges, etc.) transfer the treated and untreated C&D material to a landfill, wherein disposal fees (averages tipping fees along Gulf Coast for 2017 ~$8/cubic-yard) are assessed by the size of the truck bed or other container, independent from the weight of C&D waste that is present.

During normal demand, the disposal method in FIG. 1 may be adequate to process most C&D waste. However, issues arise during periods of high demand for landfill space such as post-storm recovery. Storm related C&D waste is often bulky waste that is time consuming and costly to process. As storm related C&D waste tends to be present on a much larger scale than most landfills are able to handle efficiently, piles of C&D waste are often left behind at the original site for weeks or month after the storm. Brush and other materials that are usually separated out and composted or recycled are often present in such large amounts during post-storm recovery that they are sent to landfills instead. Further, the increase in C&D waste after a storm also utilize an unanticipated amount of landfill space. This not only limits the landfill life but also increases the cost of disposal due to the high demand for landfill reserve capacity.

The presently described systems and methods were developed to address these issues. In particular, the systems described herein handle a large variation in feed streams of both large or bulky debris, and small debris that is waterlogged. Using a torrefaction unit, moisture and volatiles are removed from the debris, while increasing the fragility/ brittleness of the debris. This directly impacts the ability to break the solids up, reducing average particle size and degree to which downstream solids handling will yield further increases in tapped density. Such improvements in feed stream handling lead to fewer required truckloads to transfer the now treated debris to the landfill when compared to the original, un-torrefied debris. This results in substantial cost savings related to disposal as well as reduction in land use in the landfill.

In more detail, the present systems replace the dryer 103 and compactor 104 in FIG. 1 with a torrefaction unit, and requires the size reduction unit (it is no longer 'optional'). Torrefaction processes have been utilized for municipal solid wastes with higher carbon content. However, it has not been considered applicable for construction and demolition debris because this type of debris has a lower carbon content with large-scale, incompressible solids. The present systems utilize a torrefaction unit that was modified to allow for moisture removal from C&D waste and increase bulk density by increasing the friability of the torrefied products. To properly treat C&D waste to obtain an increase in bulk density (i.e. moisture removal, and particle size profile optimization) needed to increase landfill space conservation, a filtration system was added to the sweep gas exit of the torrefaction vessel to collect and clean vent gases. A blower system was added after the filtration system to direct vent gases away from the sweep gas inlet of the torrefaction vessel, and to create a vacuum on the torrefaction unit to adjust the sweep gas flow rate to enable the entrainment of ultrafines in the sweep gas while avoiding excessive plugging of the filtration system.

Additional modifications to the systems include heat exchangers to enable the recycling of heat from the torrefied streams, and debris streams recycled back to the size reduction unit and/or torrefaction unit for further processing of the larger particles, and optional recycle of vent gases as sweep gases.

The torrefaction vessel can be a rotary kiln or a rotary dryer that heats the debris at an elevated temperature while it is tumbling through an oxygen lean sweep gas atmosphere along the vessel. The debris is fed at the top of the vessel, where it then tumbles down the slight incline (i.e. a decline along the vessel length from vessel entrance to exit) in a spiral type fashion towards the outlet of the torrefaction vessel. During the tumbling, the debris particles are colliding into each other and the inside walls of the torrefaction vessel, which further reduce the size of the particles as they are being torrefied. Larger particles in the debris stream act as grinding material for themselves and smaller particles for further size reduction.

Attached to the vent exit of the torrefaction vessel is a filtration system for cleaning the sweep gas exiting the torrefaction vessel. The filtration unit uses at least one adsorbent bed, a membrane, a candle filter, and/or a bag house to remove low-boiling regulated air pollutants and ultrafines from the sweep gas. These filters are replaced as needed due to saturation by the pollutants or regenerated. After filtering, the 'clean' gas can be released as a vent gas, reused as sweep gas in the torrefaction unit, or some combination thereof.

Attached to the filtration unit is a blower. The blower serves many purposes in the present systems. The blower directs the vent gas away from the 'clean' sweep gas that will be recycled to the torrefaction vessel. Further, the blower creates a vacuum on the torrefaction unit by controlling the pressure profile of the sweep gas. This allows for the use of a low flow rate to enable both the entrainment of ultrafines in the sweep gas, and the reduction or avoidance of excessive plugging of the filters in the filtration system with the fines.

This torrefaction unit removes moisture and volatiles from the debris to reduce weight of the exiting material. The torrefaction process can also reduce the hardness of the debris, resulting in friable particles. For instance, the heat removes the water that forms the paste between cement and the aggregates in concrete, leaving behind voids, which reduce the compressive strength of the material. For drywall, heat breaks down the calcium sulfate-water crystal structure, which in turn increases its density; and for wood, the increased temperature causes softening and cell wall decomposition are associated with a loss of strength. When loading the particles for transferring to a landfill, the easily broken particles can be pressed together to a much greater extent than debris that did not undergo a torrefaction process. The resulting material is much smaller in volume, allowing more C&D waste to be added to each truck destined for the landfill.

A benefit of a torrefaction unit is the flexibility of the operational conditions, which allows for treatment of a waste stream with a variable composition and physical properties. Anything that is small enough to enter the torrefaction unit can be treated, regardless of composition. If longer residence times of the solids are needed, the angle of incline in the torrefaction vessel can be modified. Alternatively, the residence time can also be increased through a reduction of feed rate or by returning or looping the torrefied solids back through the size reduction unit and/or the torrefaction unit. Similarly, the removal of moisture in the feed material can be enhanced by adjusting the ratio of solids maintained in the torrefaction vessel's bed relative to the amount of sweep gas and, if steam is used in the sweep gas, the extent of superheating of the sweep gas.

The rotary action (i.e. RPM) of the torrefaction vessel described herein also provides the action that mixes the solids (in contact with the wall and each other) through the sweep gas (flowing through the center) as the debris flows in the axial direction. The volumetric gas flow rate can also be adjusted by changing the vessel temperature and/or the pressure profile established by the blower in the torrefaction unit. Such velocity increases result in improved convective transport of heat and volatiles.

All of these features can be enhanced by the use of rotary vessel internals (e.g. "flights"), which create stagewise increases in solids temperature and provide the pauses necessary to equilibrate the water concentrations (between gas and solid phases) at each section along the axial direction. Each pass through the torrefaction unit is expected to last at least 20 minutes. Preferably, the residence time is at least thirty minutes or more. Larger particles and waterlogged materials may require addition residence time to fully remove moisture and make the particles more friable. As such, repeated passes through the torrefaction unit can be utilized to achieve the longer residence times.

As mentioned above, a sweep gas passes through the torrefaction vessel. The sweep gas is an oxygen lean gas that can be selected from a group comprising a low pressure superheated steam with oxygen lean air, a low purity carbon dioxide (about 99%), a low purity nitrogen (about 99% nitrogen), or vent gas from the torrefaction unit. The sweep gas flows co-current or countercurrent to the movement of the debris. During torrefaction, the sweep gas interacts with the treated debris to help with the desorption of volatiles and moisture. At the same time, the sweep gases can entrain ultrafine particles and carry them out the torrefaction vessel's vent exit to the filtration system.

A buildup of ultrafine particles creates a dust explosion risk anywhere they are exposed to oxygen and come in contact with an ignition source. Therefore, ultrafines are continuously filtered from the sweep gas using the filtration system. The flow rate for the sweep gas is kept below a velocity threshold to keep the solids in contact with the torrefaction vessel surface yet avoid entraining too many of the fines fraction in the filter. This velocity threshold varies with the composition of the feed stream, and can be between 5 m/s and about 70 m/s, or between 10 and 50 m/s, or between 15 and 30 m/s or between 40 and 50 m/s. For cement or concrete predominant feeds, flow rates between about 30 and about 46 m/s are expected to keep the solids in contact with the vessel and remove ultrafines. Other feed such as wood particles, flow rates can be between about 20 and about 25 m/s.

Figure 2:
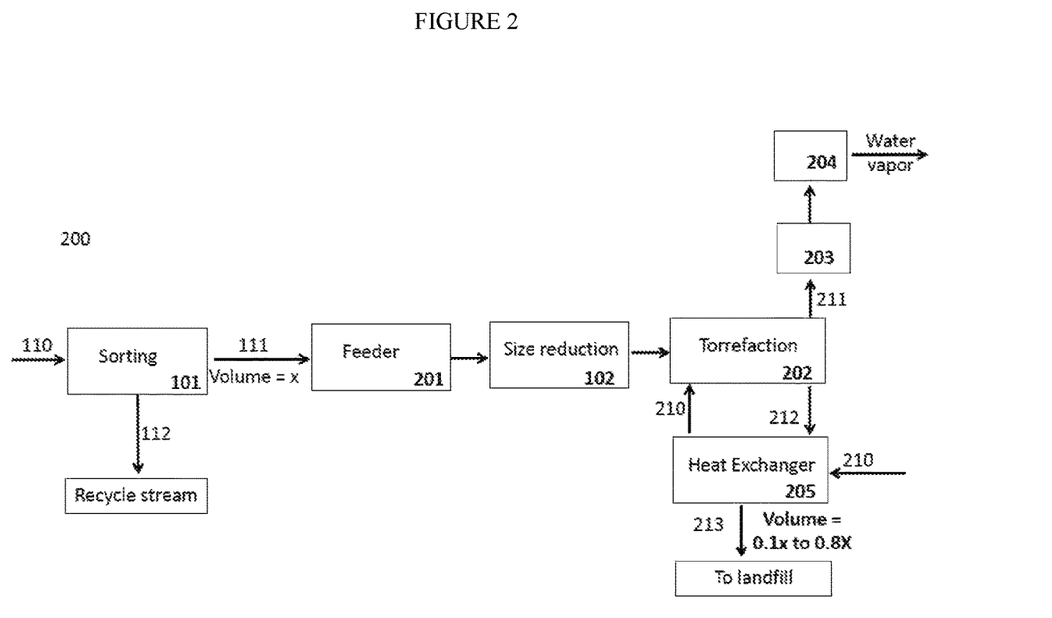
FIG. 2. Schematic of one embodiment of the present disclosure for torrefying C&D waste.

FIG. 2 displays one embodiment 200 of the presently disclosed system. This particular embodiment is a single pass torrefaction process. Additional embodiments describe optional processes for looping the torrefied solids through the size reduction and/or torrefaction unit (shown in FIG. 4) or reusing the vent gas as part of the sweep gas (shown in FIG. 3).

As before in FIG. 1, the waste 110 is first sorted at 101 to remove the recyclable material 112 and/or reject metal containing debris. The material that remains 111 will then undergo processing using a torrefaction unit in the presently described methods.

The debris will travel through a feeder 201 before undergoing a size reduction step 102 to reduce the size of the material before it is fed to a torrefaction unit. Unlike the system in FIG. 1, the size reduction step is no longer optional, even if the size of the debris is not an issue. Rather, running all debris through the size reduction unit will improve the moisture removal efficiency of the torrefaction unit saving operating cost (less torrefaction residence time). Further, processing the debris though the size reduction unit forms newly exposed surfaces on the debris, which facilitates the desorption of moisture and volatiles. The size of the debris after grinding is a function of the feed material, the mechanism used to reduce the size, and the settings of the size reduction unit. However, most particles can be reduced by a factor of 2 to 10. Preferably, the reduction factor is 5 to 6.

The size reduction unit can be any unit onsite or commercially available unit. Typically, these units incorporated grinders, shredders, mills or crushers to reduce the size of debris. In some embodiments, a grinder or shredder is preferred. The Terminator Series of Grinders from Komptech Americas, for instance, is capable of reducing the size of most debris by a factor of at least 5.

After being reduced in size, the materials are sent to a torrefaction vessel 202. In some embodiments, a screen (not shown) may be located between the size reduction unit and the torrefaction unit to prevent overly large debris from entering the torrefaction unit, while allowed smaller debris through. In this instance, the size reduction unit will process the large debris again until the debris reaches the desired size.

This torrefaction vessel 202 can have a rotary kiln or rotary dryer that heats the material at a low temperature while the materials are tumbling towards a side exit. In some embodiments, the torrefaction unit is a rotary kiln with either direct or indirect firing. Ideally, the temperature range is between about 100 and 400° C. Alternatively, the temperature can be between about 200 and 300° C. or between about 150 and about 300° C.

A sweep gas consisting of oxygen lean gas 210 flows through the torrefaction unit where it can continuously contact the moving, tumbling debris. Though shown as flowing co-current to the material in FIG. 2, either a co-current or countercurrent flow is acceptable. In some embodiments, a co-current gas flow is preferred as it is easier to maintain the temperature gradient across the fire door(s) that seals the entry points for the torrefaction vessel. The sweep gas can be heated in a heat exchanger 210 using heat derived from torrefied solids.

During the torrefaction process, moisture and volatiles are desorbed from the debris. The moisture and volatiles are entrained in the sweep gas, which sweeps them through an overhead exit out of the torrefaction unit to the filtration system 203. Ultrafines particles are also entrained in the gas. The vent gas and volatiles 211 are then filtered and separated in a filtration system 203. The filter mainly cleans the gas by adsorbing low-boiling regulated air pollutants (e.g. sulfur, chlorine or chloride, and cyanides) and the ultrafines. Filters typically included for such processes at landfill and transfers stations include adsorbent beds, membranes, candle filters, and/or bag houses, and any one or more of these are appropriate in the present system as well.

Figure 3:
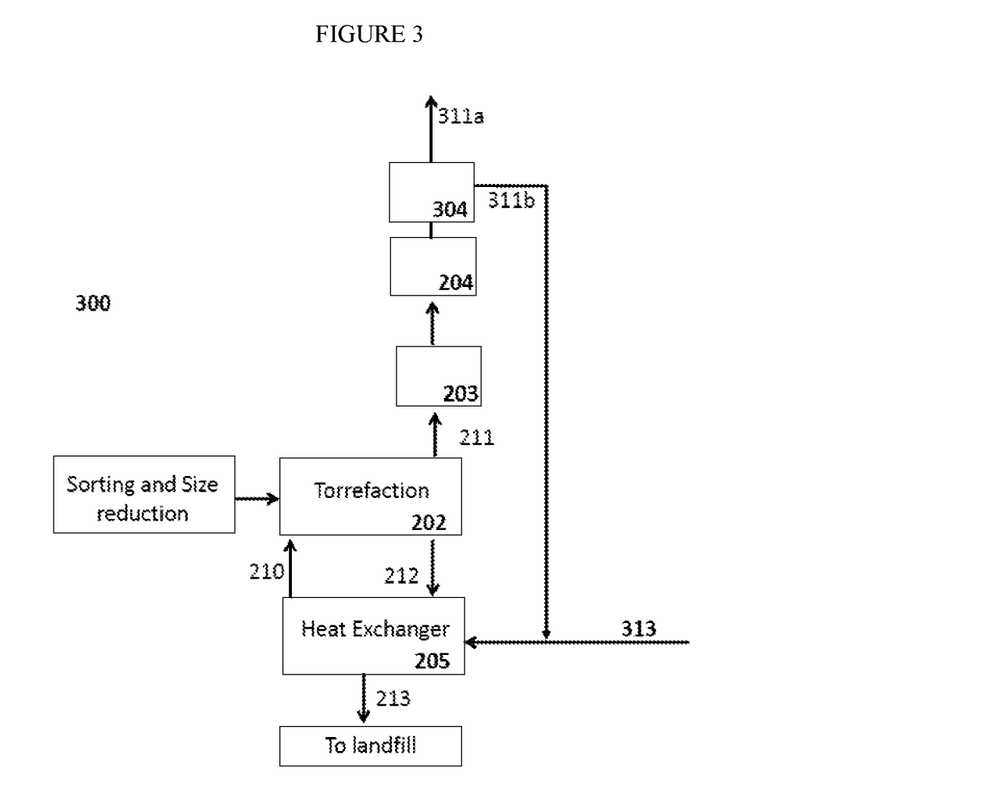
FIG. 3. Schematic of an optional gas return on the embodiment in FIG. 2.

After filtering, the gas enters a blower 204 attached to the filtration system 203. In the system described by FIG. 2, the blower creates a vacuum on the torrefaction unit by controlling the pressure profile of the sweep gas. This allows for the use of a low flow rate to enable both the selective entrainment of ultrafines in the sweep gas, and the reduction or avoidance of excessive plugging of the filters in the filtration system with the larger size particles). After passing through the blower, the 'clean' vent gas is can be released. Alternatively, some of the vent gas can be returned to the torrefaction vessel as part of the sweep gas, as shown in FIG. 3 and described below. Recycling or looping the clean vent gas is preferred as it saves energy costs associated with the torrefaction unit, such as making fresh superheated steam from a boiler unit or supply fresh gas.

The size of the solids leaving the side exit of the torrefaction vessel is a mixture of coarse particles (particle diameter greater than 5 mm), mid-size particles (particle diameter between greater than 1 mm and 5 mm), and fine particles (particle diameter between greater than 100 microns to 1 mm). The rotary action of the torrefaction vessel combined with axial transport and torrefaction temperature provide an abrasive environment such that particles wear each other down as they tumble. The size of the solids leaving the torrefaction unit is a mixture that depends on the feed content, initial particle size distribution, and any looping through the size reduction unit. In general, however, the exiting material will be about 20% by volume of coarse particles, about 20% by volume fines (not including ultrafines removed by the sweep gas), and medium size particles making up the balance.

After the torrefaction process, the torrefied solids 212 are transferred to a heat exchanger 205 such as a double pipe, plate and frame heat exchanger, or shell and tube. This exchanger allows the torrefied solids to cool (213) before being collected in a truck destined for a landfill. The heat transferred from the solids is used to heat the sweep gas 210 being used in the torrefaction unit.

The particles being collected for transfer will be compressed by overbearing solids of the load in the truck to reduce their volume. The smaller particles, or fines, will fill the void space between coarser particles, thus allowing for more material to occupy a smaller volume. With the combined grinding/devolatilization processing of the present system, the reduction of volume is much larger than that of grinding and drying alone. This, in turn, means that more debris can be placed on the truck and/or less space is needed at the landfill. Further, as the debris is being placed on the truck, the particles can further break due to increase friability from the torrefaction process.

The reduction in volume will depend on the type of debris (e.g. cement does not reduce as much or as easily as drywall), the moisture content (waterlogged materials are not as compressible unless repeatedly recycled through the torrefaction unit), the settings on size reduction unit, the settings on the torrefaction unit (temperature, residence time, etc), and the settings on the blower. As such, the reduction in volume of debris can be anywhere from 20-90%. For construction debris such as cement or concrete, a volume reduction of about 20-40% after torrefaction is preferable.

FIG. 3 displays a variation 300 of the embodiment in FIG. 2, wherein the vent gas exiting the blower is returned to the torrefaction unit. The first part of the process in FIG. 2 remains the same, but is not shown in detail in FIG. 3. In FIG. 3, the vent gas is separated into two streams by a valve 304: a stream that is vented or released into the environment 311a and a vent stream 311b that will be combined with fresh oxygen lean gas and reused. While 100% of the vent stream can be recycled as 311b, the purge of 311a is needed to address impurity build up in the sweep gas. For example, moisture or organic chemicals may build up in the gas exiting the filtration system, creating an unsafe environment in the torrefaction vessel if 100% of the gas was returned as sweep gas. As such, 40 to 50% of the gas may be released as 311a, with the remaining 50-60% being combined with fresh gas. Thus, 0 to about 50% of the gas can be purged as 311a, with the remaining gas being recycled as 311b. Both the vent stream 311b and fresh oxygen lean gas steam 313 are then heated in the heat exchanger 205 that cools the torrefied solids. If the sweep gas is steam based, then the preferred temperature is about 30 degrees above its dewpoint before entering the torrefaction unit. Looping the 'clean' sweep gas is preferred as it saves energy costs associated with using "fresh" gas and the heat needed to heat the fresh gas.

Figure 4:
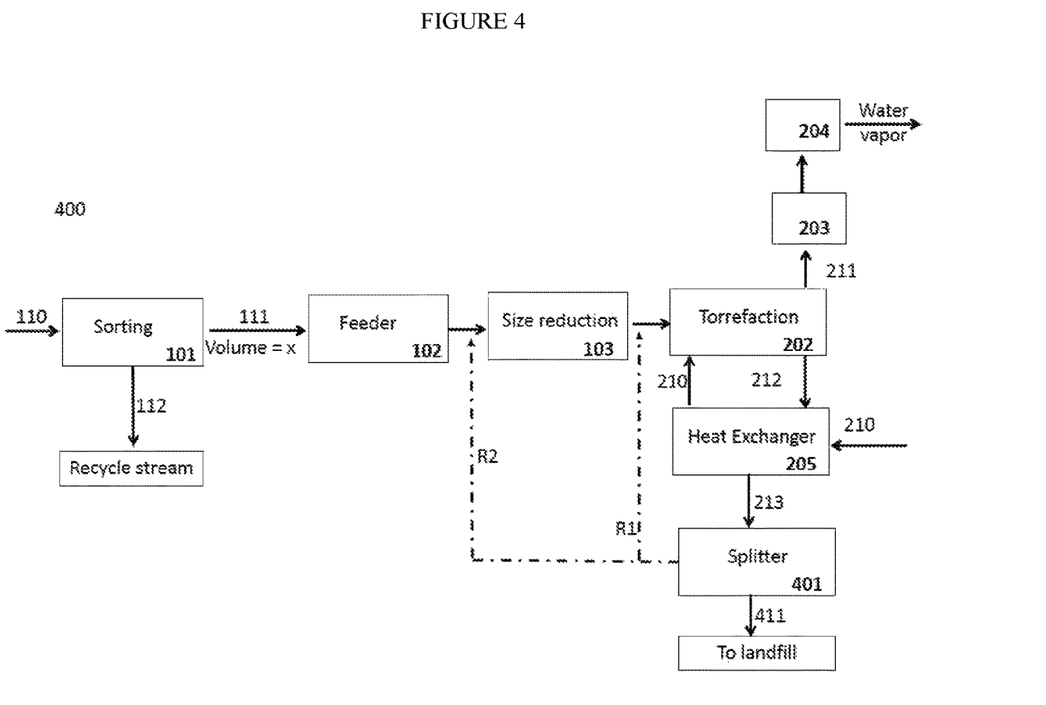
FIG. 4. Schematic of another embodiment of the present disclosure for a waste disposal system with a return stream for torrefied solids.

If the size of the particles exiting the torrefaction unit is too large, the solids may need to be passed through the size reduction unit again before undergoing the torrefaction process. One embodiment 400 of the presently disclosed system having this return stream for the torrefied solids is shown in FIG. 4. The torrefied solids can be passed through the size reduction units and/or torrefaction unit one or more times to further reduce the size of the solids, increase the amount of moisture removed, and further break down the material.

In more detail, the torrefied solids are cooled in the heat exchanger 205 as before. However, they are then separated using a splitter 401, with some of the solids moving forward to the truck 411 destined for a landfill, and the remaining solids are returned to the size reduction unit (R2) or the torrefaction unit (R1).

For any of the above embodiments, the conditions of the torrefaction unit can be adjusted to address any combination of C&D waste. One with skill in the art would know how to make such adjustments based on the material exiting the torrefaction unit compared to the initial feedstock. From there, process conditions such as torrefaction residence time, torrefaction temperature profile, sweep gas flow rate, or split fraction can be adjusted to change the properties of the outgoing material.

To evaluate the presently described methods, a shelved, sealed laboratory oven was used to torrefy typical C&D debris in batches. The C&D solids were deposited in single particle layers on the shelves with nitrogen gas flowing horizontally over each shelf. This design allowed the oven to model a rotary unit whose solids layer have good contact with sweep gas. Three different C&D materials with a range of particle sizes (fine to coarse) were chosen to represent a wide variety of C&D waste, and evaluate different features of the torrefaction process (ability to remove moisture, ability to remove organics, ability to soften particles). The C&D materials were Loblolly Pine, Oriented Strand Board (OSB), and concrete.

Loblolly Pine. The first C&D material evaluated comprised Loblolly Pine (branches, leaves, bark). Loblolly Pine has a moisture content of about 55% and was selected as a feed stream to evaluate the ability to treat waterlogged wood-based material that also have naturally occurring volatile organic compounds. Such combination would be similar to wood-based C&D wastes from storm recovery efforts.

The Loblolly Pine was chipped and then ground using a hammer mill to a 'coarse' fraction (>4.74 mm) and a 'fines' fraction (<4.74 mm). Both fractions were evaluated independently to capture process performance data as a function of particle size effects (e.g. heat and mass transport limitations). Additional evaluations were performed on mixtures of both fractions.

The fractions were torrefied at 150° C. for 1 hour followed by 2 hours at 220° C., torrefied at 150° C. for 3 hours, and torrefied at 150° C. for 1 hour followed by 0.5 hours at 220° C. Table 1 displays the moisture content as well as the bulk (loose packing) and tapped (tight packing) density of both fractions before and after torrefaction.

Comparisons of bulk and tapped density represent the packing density associated with a given sample of solids and the extent to which voids in the sample can be filled with smaller particles. For a given moisture level, the tapped density is larger than the bulk density. Comparison of the densities for the coarse and fine fraction relates to solids composition differences as well as the extent to which moisture and volatiles have been removed from the particles.

TABLE 1

Moisture and density content of Loblolly Pine before and after torrefaction

| | Solids Before Torrefaction | | | Solids After Torrefaction | | |
|---|---|---|---|---|---|---|
| | Moisture (wt. %) | Bulk Density | Tapped Density (kg/m³) | Moisture (wt. %) | Bulk Density | Tapped Density (kg/m³) |
| Run 1A) Torrefied at 150° C. for 1 hour followed by 2 hours at 220° C. | | | | | | |
| Coarse | 55.5 | 326.5 | 378.7 | 0.0 | 166.0 | 183.0 |
| Fine | 56.2 | 267.2 | 329.3 | 0.8 | 136.7 | 162.4 |
| Run 1B) Torrefied at 150° C. for 3 hours | | | | | | |
| Coarse | 57 | 326.5 | 378.7 | 1.4 | 179.2 | 213.3 |
| Fine | 53.9 | 267.2 | 329.3 | 0.0 | 155.9 | 169.3 |
| Run 1C) Torrefied at 150° C. for 1 hour followed by 0.5 hours at 220° C. | | | | | | |
| Coarse | 56.0 | 326.5 | 378.7 | −0.1 | 190.5 | 206 |
| Fine | 55.8 | 267.2 | 329.3 | 1.4 | 173.2 | 179.7 |

The density data in Table 1 shows that the process removes mass more efficiently for the fines fraction than the coarse. Fines have a smaller particle diameter and a larger surface area to volume ratio, thus heat transfer is more efficient. This is further shown by a comparison of Run 1A and 1B. Both of these runs had a three hour total residence time; however, the higher target temperature in Run 1A removed a larger amount of volatiles, resulting in lower final particle densities than Run 1B.

Table 2 displays the measured hardness of both the coarse and fine Loblolly Pine fractions before and after torrefaction. The hardness was determined by using a set ball mill procedure to grind equal-volume samples (e.g. fresh or torrefied pine) at a fixed RPM using a fixed amount of prescribed grinding media for a specified grinding time. A comparison of the relative decrease in particle size (represented here by $\Delta d50/d50$) corresponds to a decrease in hardness. The larger this value, the more brittle the material has become.

TABLE 2

Hardness of Loblolly Pine before and after torrefaction

| | Solids Before Torrefaction | | | Solids After Torrefaction | | |
|---|---|---|---|---|---|---|
| | d50 (mm) | d50H (mm) | L'id50/d50* | d50 (mm) | d50H (mm) | L'id50/d50* |
| Run 1A) Torrefied at 150° C. for 1 hour followed by 2 hours at 220° C. | | | | | | |
| Coarse | 14.45 | 6.64 | 0.54 | 12.51 | 2.57 | 0.79 |
| Fine | 2.30 | 1.775 | 0.23 | 1.90 | 0.76 | 0.60 |
| Run 1B) Torrefied at 150° C. for 3 hours | | | | | | |
| Coarse | 14.45 | 6.64 | 0.54 | 12.15 | 3.33 | 0.73 |
| Fine | 2.3 | 1.775 | 0.23 | 2.1 | 1.12 | 0.47 |
| Run 1C) Torrefied at 150° C. for 1 hour followed by 0.5 hours at 220° C. | | | | | | |
| Coarse | 14.45 | 6.64 | 0.54 | 12.325 | 3.09 | 0.75 |
| Fine | 2.3 | 1.775 | 0.23 | 1.97 | 0.92 | 0.53 |

*$\Delta d50/d50 = (d50 - d50H)/d50$

As shown in Table 2, both the coarse and fine fractions of the Loblolly Pine show a reduction in hardness caused by torrefaction. The torrefied coarse fractions, for example, have $\Delta d50/d50$ values of 0.79 (Run IA), 0.73 (Run 1B), and 0.75 (Run IC), which is much larger than the untorrefied value of 0.54. Similar results are seen for the fine fractions (0.60 (Run IA), 0.47 (Run 1B), and 0.53 (Run IC) are larger than 0.23). Thus, the present process was able to remove moisture and increase the friability of both coarse and fine particles of Loblolly Pine. In combination with the changes in densities shown in Table 1, the torrefaction process resulted in both removing mass (density reduction caused largely by moisture removal) and reduction in particle size (density increase by 2 mm decrease).

Table 3 shows case study calculations based on the results shown in Tables 1 and 2 to determine the overall performance of torrefaction as a function of feed particle size distribution (psd) and operating conditions. Regarding operation conditions, adjustments to the temperature or residence time only will allow a user to achieve the desired volume reduction. The results for the torrefaction at 220° C. for 30 minutes produced similar results to torrefaction at lower temperatures for 3 hours. Thus, adjusting the temperature is on par with the results longer residence times. The tradeoff is the cost of operating the system at higher temperatures. Alternatively, one could install/configure a larger torrefaction vessel or a return loop such as that shown in FIG. 4 to achieve the longer residence times. If both longer residence time and high temperatures are used, as is the case for the samples torrefied at 220° C. for 2 hours, even greater reductions in volumes can occur.

TABLE 3

Reduction in volume of mixed Loblolly Pine feed stream

| Case Study No. | kg Coarse per kg Feed | kg Fines per kg Feed | Torrefied at 150° C. for 1 hour followed by 2 hours at 220° C. m³ exit/m³ feed | Torrefied at 150° C. for 3 hours m³ exit/m³ feed | Torrefied at 150° C. for 1 hour followed by 0.5 hours at 220° C. m³ exit/m³ feed |
|---|---|---|---|---|---|
| 1 | 0.8 | 0.2 | 0.57 | 0.50 | 0.56 |
| 2 | 0.9 | 0.1 | 0.50 | 0.44 | 0.50 |
| 3 | 0.7 | 0.3 | 0.42 | 0.38 | 0.42 |
| 4 | 0.6 | 0.4 | 0.36 | 0.32 | 0.36 |

Oriented Strand Board. The second C&D material evaluated comprised Oriented Strand Board (OSB), which is a type of engineered wood similar to particle board that is formed by adding adhesives and then compressing layers of wood strands (flakes) in specific orientations. OSB has a relatively low moisture content of about 3%, but a high added organic chemical content (e.g. woody biomass with chemical organic additives).

The OSB was purchased from a hardware store and ground using a hammer mill to a coarse fraction (>4.74 mm) and a fines fraction (<4.74 mm). As with the Loblolly Pine, both fractions were tested independently to capture process performance data as a function of particle size effects (e.g. heat and mass transport limitations), under the same torrefaction condition. Table 4 displays the moisture content as well as the bulk (loose packing) and tapped (tight packing) density of both fractions before and after torrefaction. Despite the low level of the initial moisture content, Runs 2A and 2C were not able to remove all the moisture. It is hypothesized that some transport limitation held back the water in the solid phase since the additional residence time (RUN 2B v. Run 2C) yields a dryer solid.

TABLE 4

Moisture and density content of OSB before and after torrefaction

| | Solids Before Torrefaction | | | Solids After Torrefaction | | |
|---|---|---|---|---|---|---|
| | Moisture (wt. %) | Bulk Density | Tapped Density (kg/m³) | Moisture (wt. %) | Bulk Density | Tapped Density (kg/m³) |
| Run 2A) Torrefied at 150° C. for 1 hour followed by 2 hours at 220° C. | | | | | | |
| Coarse | 3.8 | 156.1 | 177.6 | 1.8 | 163.4 | 178.9 |
| Fine | 3.7 | 159.4 | 215.6 | 1.3 | 175.8 | 221.1 |
| Run 2B) Torrefied at 150° C. for 3 hours | | | | | | |
| Coarse | 2.9 | 156.1 | 177.6 | 0.1 | 165.6 | 179.7 |
| Fine | 3 | 159.4 | 215.6 | 0.0 | 183.9 | 211.2 |
| Run 2C) Torrefied at 150° C. for 1 hour followed by 0.5 hours at 220° C. | | | | | | |
| Coarse | 2.6 | 156.1 | 177.6 | 0.9 | 154 | 175.5 |
| Fine | 3.1 | 159.4 | 215.6 | 0.4 | 164.2 | 204.2 |

Table 5 displays the measured hardness before and after torrefaction, using the comparison of the relative decrease in particle size (Δd50/d50). As with the Loblolly Pine, the hardness was determined by using a set ball mill procedure to grind equal-volume samples (e.g. fresh or torrefied pine) at a fixed RPM using a fixed amount of prescribed grinding media for a specified grinding time. The increase in this index (Δd50/d50) shows that hardness does decrease; however, the change is less than in the Loblolly Pine.

TABLE 5

Hardness of OSB before and after torrefaction

| | Solids Before Torrefaction | | | Solids After Torrefaction | | |
|---|---|---|---|---|---|---|
| | d50 (mm) | d50H (mm) | L'id50/d50* | d50 (mm) | d50H (mm) | L'id50/d50* |
| Run 2A) Torrefied at 150° C. for 1 hour followed by 2 hours at 220° C. | | | | | | |
| Coarse | 9.21 | 5.13 | 0.44 | 9.54 | 3.85 | 0.60 |
| Fine | 1.43 | 1.29 | 0.10 | 1.47 | 0.95 | 0.35 |
| Run 2B) Torrefied at 150° C. for 3 hours | | | | | | |
| Coarse | 9.21 | 5.13 | 0.44 | 8.67 | 4.21 | 0.51 |
| Fine | 1.43 | 1.29 | 0.1 | 1.45 | 1.19 | 0.18 |
| Run 2C) Torrefied at 150° C. for 1 hour followed by 0.5 hours at 220° C. | | | | | | |
| Coarse | 9.21 | 5.13 | 0.44 | 8.97 | 3.54 | 0.61 |
| Fine | 1.43 | 1.29 | 0.1 | 1.42 | 1.03 | 0.27 |

*Δd50/d50 = (d50 − d50H)/d50

Table 6 shows a case study calculation based on the results shown in Tables 4 and 5 to determine the overall performance of torrefaction as a function of feed particle size distribution (psd) and operating conditions. For Case Study No. 1, the relative densities for this combination of coarse and fines resulted in a total volume exceeds 1. Thus, at least 0.2 kg fines per kg of total feed would be needed to obtain efficient packing and optimal torrefaction transport.

TABLE 6

Reduction in volume of mixed OSB feed stream

| Case Study No. | kg Coarse per kg Feed | kg Fines per kg Feed | Torrefied at 150° C. for 1 hour followed by 2 hours at 220° C. m³ exit/m³ feed | Torrefied at 150° C. for 3 hours m³ exit/m³ feed | Torrefied at 150° C. for 1 hour followed by 0.5 hours at 220° C. m³ exit/m³ feed |
|---|---|---|---|---|---|
| 1 | 0.8 | 0.2 | 1.05 | 1.05 | 1.03 |
| 2 | 0.9 | 0.1 | 0.95 | 0.95 | 0.93 |
| 3 | 0.7 | 0.3 | 0.85 | 0.84 | 0.82 |
| 4 | 0.6 | 0.4 | 0.74 | 0.73 | 0.71 |
| 5 | 0.5 | 0.5 | 0.63 | 0.62 | 0.60 |

As discussed above, OSB was chosen to evaluate the volatilization of organic compounds, and their removal in the vent stream According to the MSDS for OSB, this material can contain between 1 and 14 wt % of a phenol-formaldehyde resin, a compound used to glue wood particles together. Based on this information, a Flame Ionization Detector (FID) was used to compare the Residence Time profile of vent gases dissolved in condensate generated from the oven vent gases for both the Pine Loblolly and the OSB. As shown in Table 7, the organic profiles for Pine Loblolly and OSB show peaks in common and others only associated with one material. In both materials, the torrefaction system can be designed and operated to separate the solids form the volatiles, which can then be collected by the filters in the filtration system.

TABLE 7

FID Results of condensate generated from the oven vent gases for both the Pine Loblolly and the OSB

| Residence Time | wt % of Organic Fractions, 2 hr of Torrefaction at 220° C. | |
|---|---|---|
| minutes | Pine | OSB Coarse |
| 5.717[3] | X | X |
| 7.015 | X | |
| 7.022 | | X |
| 9.402 | | X |
| 9.775 | | X |
| 10.497 | X | |
| 11.510[2] | X | |
| 12.038[1] | | X |
| 13.291 | X | X |
| 17.862 | | X |
| 20.899 | X | X |
| 22.510 | | X |
| 24.554 | | X |
| 26.687 | | X |

[1]Furfural
[2]Formic Acid dimer
[3]Formic Acid

Concrete. The third C&D material evaluated comprised concrete. Concrete is a large volume component of C&D waste, and represents a large fraction of storm debris that ends up in landfills even though recycling methods for concrete exist. During recycling methods, metal rebar is first removed from the concrete followed by filtering out dirt and sand. A crushing step then converts the various shapes and sizes into saleable grades of aggregate material. In this case, the "provenance" of the solids are known (e.g. roads, foundations, buildings, drainage structures) when they arrive at a concrete recycling plant. When storm/flood concrete debris is sent to DCH, there is no information about the water quality that corresponds to the moisture content and the degree to which the pH and other cement compound chemistry have changed. In contrast to Loblolly Pine and chemically treated wood products, concrete is an inorganic material with no fixed carbon to speak of and densities an order of magnitude higher. Thus, concrete undergoes often only undergoes a size reduction and optional compaction before being transferred to landfills.

For the present evaluations, 3" and 1" minus samples from sorted material at a Concrete Recycling Facility feed were obtained and further sieved into coarse fraction (>4.74 mm) and a fines fraction (<4.74 mm), similar to the prior feeds.

Table 8 displays the moisture content of both coarse and fine streams before and after torrefaction takes place, as well as their bulk (loose packing) and tapped (tight packing) density. According to the "Before" results, this material represents an intermediate case (6 to 10%) between the OSB and Loblolly Pine levels of moisture. With removal of moisture, the bulk density concrete changes depending on the run conditions. The final tapped densities, however, are all smaller than those corresponding to the "Before" column. In contrast to Tables 1 and 4, Run 3C yielded the lowest densities. As a result, an additional run was performed, Run 3D (150° C. for 1 hour). However, these results were even lower with not all of the moisture being removed.

TABLE 8

Moisture and density content of Concrete before and after torrefaction

| | Solids Before Torrefaction | | | Solids After Torrefaction | | |
|---|---|---|---|---|---|---|
| | Moisture (wt. %) | Bulk Density | Tapped Density (kg/m³) | Moisture (wt. %) | Bulk Density | Tapped Density (kg/m³) |
| Run 3A) Torrefied at 150° C. for 1 hour followed by 2 hours at 220° C. | | | | | | |
| Coarse | 6.4 | 1387.4 | 1606.1 | 0.0 | 1408.4 | 1482.0 |
| Fine | 10.3 | 1281.1 | 1554.7 | 0.0 | 1373.7 | 1468.1 |
| Run 3B) Torrefied at 150° C. for 3 hours | | | | | | |
| Coarse | 6.8 | 1387.4 | 1606.1 | 0.0 | 1305.2 | 1456.0 |
| Fine | 11 | 1281.1 | 1554.7 | 0.0 | 1357.5 | 1513.8 |
| Run 3C) Torrefied at 150° C. for 1 hour followed by 0.5 hours at 220° C. | | | | | | |
| Coarse | 7.3 | 1387.4 | 1606.1 | 0.0 | 1291.1 | 1438.9 |
| Fine | 11 | 1281.1 | 1554.7 | 0.1 | 1382.2 | 1453.7 |
| Run 3D) Torrefied at 150° C. for 1 hour | | | | | | |
| Coarse | 6.6 | 1387.4 | 1606.1 | 0.1 | 1261.7 | 1343.3 |
| Fine | 10.0 | 1281.1 | 1554.7 | 0.2 | 1379.4 | 1420.4 |

Table 9 reports the results for volume reduction as represented by Δd50/d50. As before, the hardness was determined by using a set ball mill procedure to grind equal-volume samples (e.g. fresh or torrefied pine) at a fixed RPM using a fixed amount of prescribed grinding media for a specified grinding time. Table 9 shows that the hardness of the coarse concrete fraction was unaffected by torrefaction while the fines fraction becomes about 20% more brittle.

TABLE 9

Hardness of Concrete before and after torrefaction

| | Solids Before Torrefaction | | | Solids After Torrefaction | | |
|---|---|---|---|---|---|---|
| | d50 (mm) | d50H (mm) | *Δ50/d50 | d50 (mm) | d50H (mm) | *L'id50/d50 |
| Run 3A) Torrefied at 150° C. for 1 hour followed by 2 hours at 220° C. | | | | | | |
| Coarse | 17.84 | 1.39 | 0.92 | 16.46 | 1.165 | 0.93 |
| Fine | 3.86 | 1.13 | 0.70 | 3.12 | 0.32 | 0.87 |
| Run 3B) Torrefied at 150° C. for 3 hours | | | | | | |
| Coarse | 17.84 | 1.39 | 0.92 | 15.72 | 0.79 | 0.95 |
| Fine | 3.86 | 1.13 | 0.71 | 3.04 | 0.33 | 0.89 |
| Run 3C) Torrefied at 150° C. for 1 hour followed by 0.5 hours at 220° C. | | | | | | |
| Coarse | 17.84 | 1.39 | 0.92 | 16.34 | 1.045 | 0.94 |
| Fine | 3.86 | 1.13 | 0.71 | 3.25 | 0.39 | 0.88 |
| Run 3D) Torrefied at 150° C. for 1 hour | | | | | | |
| Coarse | 17.84 | 1.39 | 0.92 | 17.25 | 1.43 | 0.92 |
| Fine | 3.86 | 1.13 | 0.71 | 3.10 | 0.41 | 0.87 |

Table 10 shows a case study calculation based on the results shown in Tables 8 and 9 to determine the overall performance of torrefaction as a function of feed particle size distribution (psd) and operating conditions.

TABLE 10

Reduction in volume of mixed Concrete feed stream

| Case Study No | kg Coarse per kg Feed | kg Fines per kg Feed | Torrefied at 150° C. for 1 hour followed by 2 hours at 220° C. m³ exit/m³ feed | Torrefied at 150° C. for 3 hours m³ exit/m³ feed | Torrefied at 150° C. for 1 hour followed by 0.5 hours at 220° C. m³ exit/m³ feed | Torrefied for 1 hrs at 150° C. m³ exit/m³ feed |
|---|---|---|---|---|---|---|
| 1 | 0.8 | 0.2 | 0.96 | 0.95 | 0.95 | 0.88 |
| 2 | 0.9 | 0.1 | 0.85 | 0.85 | 0.83 | 0.78 |
| 3 | 0.7 | 0.3 | 0.75 | 0.74 | 0.73 | 0.69 |
| 4 | 0.6 | 0.4 | 0.64 | 0.64 | 0.62 | 0.59 |
| 5 | 0.5 | 0.5 | 0.53 | 0.53 | 0.52 | 0.5 |

Thus, for the concrete fed, the final density after torrefaction depended on both water removal and particle size. The hardness of the fines stream was reduced by 20% while the coarse fractions' hardness remained unchanged by the torrefaction conditions. This result is different from that obtained using Loblolly Pine and OSB. In both Loblolly Pine and OSB, the coarse particle diameter decreased by the same amount before and after torrefaction. However, additional cycles through a size reduction unit and increases in torrefaction residence time or temperature will improve the hardness for the coarse concrete.

Thus, the ability to torrefy C&D debris to reduce moisture content and hardness while collecting air regulated pollutant were exemplified with respect to a shelved oven. Though the above experiments focused on batch data using an oven, not a rotary system, the data can be extended to describe the behavior in a continuous process. For example, the length of time at the target temperature is equivalent to residence time in the rotary system; the length of the commercial torrefaction vessel is equal to the solids axial transport velocity (solids feed rate divided by the area of the vessel cross-section) multiplied by the residence time. The temperature profile for the oven as a function of time scales to length by multiplying the solids axial velocity by the residence time at different temperatures. As such, similar results are expected with commercial size equipment and torrefaction vessels with moving beds such as rotary kilns and dryers. The economically optimum setting for the torrefaction vessel will require an evaluation of the tradeoff between residence time and temperature for this process and debris under consideration.

A benefit of the currently described systems and methods is that lower volumes of treated debris at a DCH translate into fewer trips to the landfill, saving both cost and space. As exemplified by the treatment of the three materials described above, the reduction in volume after torrefaction avoids having to permit additional disposal sites in storm-prone coastal communities.

The following references are incorporated by reference in their entirety.

US20110278384
US20170190975
US20180072955

The invention claimed is:

1. A method for reducing a volume of a construction and demolition debris feedstock comprising:
    a) separating construction and demolition debris into a recycle stream, a reject stream, and a construction and demolition debris feedstock comprising concrete;
    b) reducing a size of said construction and demolition debris feedstock using a size reduction unit to produce a particle size distribution diameter between about 0.1 and 10 mm;
    c) torrefying said construction and demolition debris feedstock in a torrefaction vessel having a temperature of 100-400° C. for at least 0.5 hours, wherein said torrefying evaporates moisture and volatile compounds from said construction and demolition debris feedstock;
    d) removing said moisture and volatile compounds from said torrefaction vessel using a heated sweep gas;
    e) transferring said torrefied construction and demolition debris feedstock to a heat exchanger to produce a cooled torrefied construction and demolition debris feedstock, wherein heat from said torrefied construction and demolition debris feedstock is used to heat said sweep gas in step d);
    f) transferring said cooled torrefied construction and demolition debris feedstock to a landfill, wherein a volume of said cooled torrefied construction and demolition debris feedstock is reduced by at least 40% compared to construction and demolition debris feedstock that is not torrefied.

2. The method of claim 1, wherein the torrefaction vessel is a rotary unit selected from a rotary kiln or a rotary dryer.

3. The method of claim 1, wherein said size reduction unit is a grinder, a shredder, a crusher, or a mill.

4. The method of claim 1, wherein said torrefaction vessel has a temperature between about 150° C. and about 300° C.

5. The method of claim 1, further comprising a step of compressing said cooled torrefied construction and demolition debris feedstock in a compactor before transferring it to the landfill.

6. The method of claim 1, wherein said sweep gas also removes ultrafine particles from 5 torrefaction vessel.

7. The method of claim 1, wherein said sweep gas has a flow rate of between 5 m/s and 70 m/s.

8. The method of claim 6, wherein said volatile compounds include one or more low-boiling regulated air pollutants including sulfur, chlorine or chloride, and cyanides, and further comprising a step of filtering one or more low-boiling regulated air pollutants and ultrafine particles from said sweep gas using a filter to form a clean sweep gas.

9. The method of claim 8, wherein said filtering step uses at least one of an adsorbent bed, a membrane, or a candle filter, or a bag house.

10. The method of claim 8, further comprising a step of transferring heat from said torrefied construction and demolition debris feedstock to said clean sweep gas using said heat exchanger, and using said heated clean sweep gas in said removing step d.

11. A method for reducing a volume of a construction and demolition debris feedstock comprising:
   a) separating construction and demolition debris into a recycle stream, a reject stream, and a construction and demolition debris feedstock,
   b) reducing a size of said construction and demolition debris feedstock using a size reduction unit to produce a particle size distribution diameter between about 0.1 and 10 mm;
   c) torrefying said construction and demolition debris feedstock in a torrefaction vessel having a temperature of 100-400° C. for at least 0.5 hours, wherein said torrefying evaporates moisture and volatile compounds from said construction and demolition debris feedstock;
   d) removing said moisture and volatile compounds from said torrefaction vessel using a heated sweep gas;
   e) transferring said torrefied construction and demolition debris feedstock to a heat exchanger to produce a cooled torrefied construction and demolition debris feedstock, wherein heat from said torrefied construction and demolition debris feedstock is used to heat said sweep gas in step d);
   f) splitting said cooled torrefied construction and demolition debris feedstock into two streams wherein a first stream comprises larger particles than a second stream and is returned to said size reduction unit to undergo steps b) to e) one or more times and said second stream is transferred to the landfill,
   wherein a volume of said cooled torrefied construction and demolition debris feedstock is reduced by at least 40% compared to construction and demolition debris feedstock that is not torrefied.

12. A method for reducing a volume of a construction and demolition debris feedstock comprising:
   a) separating construction and demolition debris into a recycle stream, a reject stream, and a construction and demolition debris feedstock,
   b) reducing a size of said construction and demolition debris feedstock using a size reduction unit to produce a particle size distribution diameter between about 0.1 and 10 mm;
   c) torrefying said construction and demolition debris feedstock in a torrefaction vessel having a temperature of 100-400° C. for at least 0.5 hours, wherein said torrefying evaporates moisture and volatile compounds from said construction and demolition debris feedstock;
   d) removing said moisture and volatile compounds from said torrefaction vessel using a heated sweep gas;
   e) transferring said torrefied construction and demolition debris feedstock to a heat exchanger to produce a cooled torrefied construction and demolition debris feedstock, wherein heat from said torrefied construction and demolition debris feedstock is used to heat said sweep gas in step d);
   f) splitting said cooled torrefied construction and demolition debris feedstock into two streams, wherein a first stream comprises greater than 0 to about 60% of said cooled torrefied particles and a second stream comprises remaining cooled torrefied particles, wherein said first stream is returned to said size reduction unit to undergo steps b) to e) one or more times and said second stream is transferred to said landfill, wherein a volume of said cooled torrefied construction and demolition debris feedstock is reduced by at least 40% compared to construction and demolition debris feedstock that is not torrefied.

* * * * *